United States Patent [19]

Zimmerly

[11] Patent Number: 4,568,115
[45] Date of Patent: Feb. 4, 1986

[54] MULTI-PIECE PIPE CLAMP

[75] Inventor: Robert D. Zimmerly, Kenosha, Wis.

[73] Assignee: Ladish Co., Cudahy, Wis.

[21] Appl. No.: 486,756

[22] Filed: Apr. 20, 1983

[51] Int. Cl.⁴ .............................................. F16L 23/00
[52] U.S. Cl. ...................................... 285/411; 24/285
[58] Field of Search ............... 285/373, 419, 365, 366, 285/367, 407, 408, 409, 410, 411; 24/270, 279-285

[56] References Cited

U.S. PATENT DOCUMENTS

| 494,996 | 4/1893 | Dwelle | 285/419 |
| 2,449,795 | 9/1948 | Stillwagon | 285/373 X |
| 3,964,773 | 6/1976 | Stade et al. | 285/367 |
| 4,123,095 | 10/1978 | Stehlin | 285/411 X |
| 4,408,788 | 10/1983 | Beukema | 285/419 |

FOREIGN PATENT DOCUMENTS

| 25958 | 1/1884 | Fed. Rep. of Germany | 285/373 |
| 1196266 | 11/1959 | France | 285/367 |

*Primary Examiner*—Dave W. Arola
*Attorney, Agent, or Firm*—Fuller, House & Hohenfeldt

[57] ABSTRACT

An improved multi-piece pipe clamp particularly useful for clamping the ends of two flanged sanitary pipes together in longitudinal alignment. When in the closed position the clamp engages the flanges to draw the pipe faces into intimate sealing contact. The clamp pieces pivot with respect to each other to an open position which more nearly approximates the closed position than previous clamps, thus facilitating assembly of the clamp and pipes.

9 Claims, 6 Drawing Figures

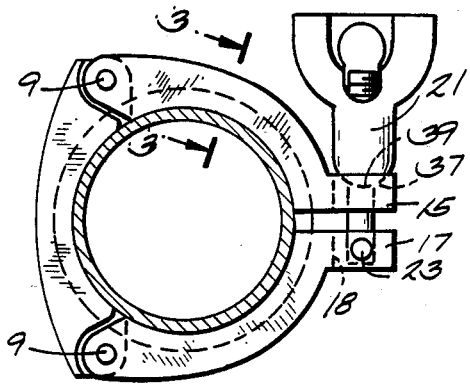
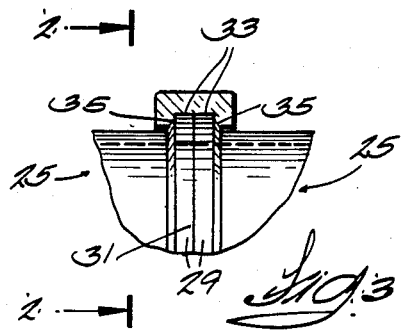
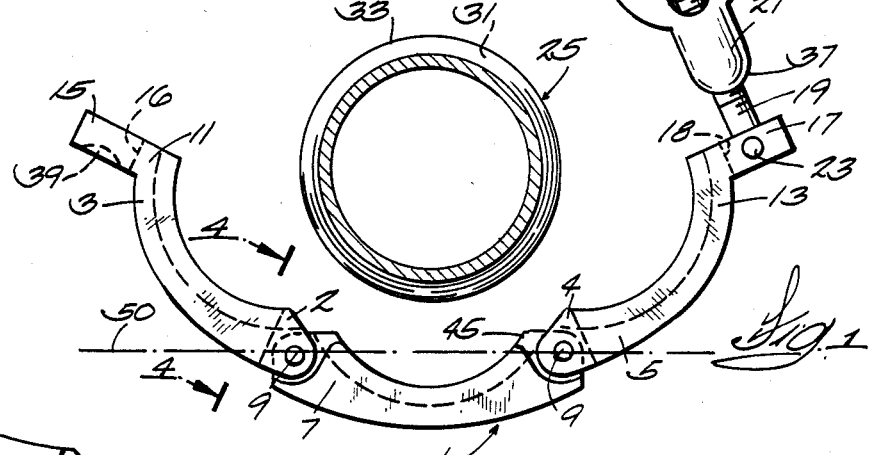
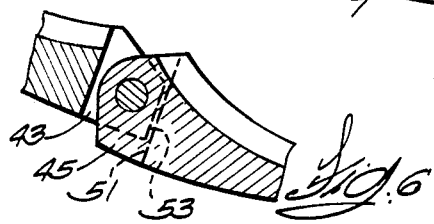
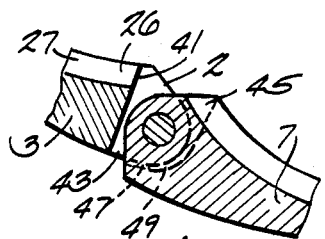
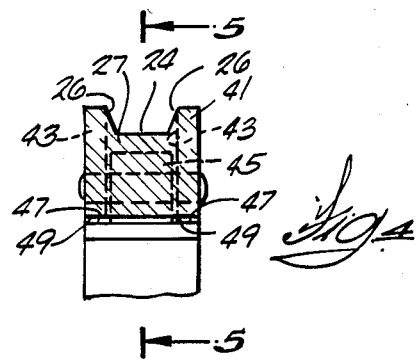

MULTI-PIECE PIPE CLAMP

BACKGROUND OF THE INVENTION

1. Field of the Invention

This invention pertains to clamping apparatus, and more particularly to apparatus for clamping adjacent sections of tubing or pipe in longitudinal alignment.

2. Description of the Prior Art

It has long been known to clamp fluid carrying tubings and pipes together by means of segmented external clamps. Typically, the ends of each section of pipe are formed with circumferential flanges. The face of each flange is flat for providing intimate sealing contact with the face of the adjacent pipe flange. Gaskets may also be employed to enhance sealing. The side of each flange opposite the flat face is typically tapered divergently toward the flat face. The adjacent pipe sections are held rigidly in proper alignment by a clamp adapted to engage the flanges.

The clamps are usually comprised of at least two pieces pivotable with respect to each other. The clamp pieces are adapted to conform to the tapers of the flanges. In the operative position, the pieces encircle and engage the flanges. Various locking mechanisms are employed to tightly but detachably fasten the free ends of the clamp pieces to each other, thus drawing the two pipe flanges into tight sealing abutting contact. U.S. Pat. Nos. 1,162,362; 2,673,102; and 3,744,825 illustrate pipe clamps having two flange-encircling pieces. U.S. Pat. Nos. 3,181,901 and 4,123,095 disclose three piece clamps. U.S. Pat. No. 2,788,993 shows a four piece clamp.

Flanged pipes and multi-piece pivotable clamps are particularly useful in the food processing industry. That is because the piping system requires frequent disassembly for cleaning, and the flanged connection system allows relatively quick disassembly, cleaning, and assembly.

However, present clamping devices are deficient in important aspects. For example, present clamps allow the hinged pieces to pivot relative to each other through wide angles, sometimes approaching 180°. U.S. Pat. No. 2,788,993 shows an open clamp with the four pivotable pieces lying approximately in a straight line. However, it is clear that the four pieces are not constrained in that configuration. Rather, the pieces are freely swingable so as to be further openable with respect to the closed pipe encircling position. With but one exception, the other patents listed above also are openable more than 90° with respect to the closed position. In U.S. Pat. No. 1,162,362, each of the two clamp pieces is shown opened about 90° with respect to the closed position. However, it appears that the opened position is governed by the relative locations of the pins, not labelled, and the outer diameters of the pieces A. A variation of either component would alter the open position, and it appears that those two variables are not controlled.

The disadvantage of a pipe clamp with widely openable pieces is that the clamp is relatively difficult to manipulate around flanged pipes using only one hand. The normal assembly procedure is to hold adjacent pipes together with one hand and to apply one clamp piece to the flanges with the second hand. However, it is awkward to swing one or more loosely dangling clamp pieces to surround the pipe flanges with one hand while holding two pipes and possibly a gasket together with the other hand.

Accordingly, a need exists for a multipiece flange securing clamp that may be more easily and quickly assembled than is presently possible.

SUMMARY OF THE INVENTION

In accordance with the present invention, there is provided a clamp comprising a plurality of pivotable pieces that are rapidly and easily positioned around the end flanges of adjacent pipes to longitudinally secure and align the pipes. This is accomplished in the present instance by fabricating the pieces of the pivotable clamp with cooperating stop members to limit the fully opened position of the clamp. In that way, one piece of the clamp can easily be set onto the pipe flanges with one hand, and then by a little flip the other pieces will swing completely around the periphery of the flanges where they can be grasped by both hands. Finally, to firmly join and align the pipes and to provide a fluid seal, the two clamp end pieces are secured together by a locking mechanism. Thus, the limited open position of the clamp pieces greatly facilitates assembly of the pipes. This is particularly important in the food processing industry, where pipes used to convey edible products must be disassembled, cleaned, and assembled frequently. Thus, the pipe clamp of the present invention overcomes the problems of cumbersome widely openable clamps to reduce nonproductive assembly time.

Other objects and advantages of the present invention will become apparent from the disclosure.

DESCRIPTION OF THE DRAWINGS

FIG. 1 shows a multi-piece pipe clamp of the present invention in the fully opened position, together with an end view of a flanged pipe;

FIG. 2 is an expanded sectional view taken along lines 2—2 of FIG. 3, and shows the pipe clamp of the present invention in locked engagement with the flanges of clamped pipes;

FIG. 3 is a partial cross-sectional view taken along lines 3—3 of FIG. 2;

FIG. 4 is a sectional view taken along lines 4—4 of FIG. 1;

FIG. 5 is a sectional view taken along lines 5—5 of FIG. 4; and

FIG. 6 is a view similar to FIG. 5 but showing a modified version of the pivotal connection between two clamp pieces.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, reference numeral 1 indicates the multi-piece pipe clamp of the present invention. In the preferred embodiment, the clamp comprises generally arcuate end pieces 3 and 5 and a generally arcuate center piece 7. The inner ends 2, 4 of end pieces 3, 5, respectively, are pivotably fastened to the ends of the center piece 7 by means of pins 9. The outer ends 11, 13 of end pieces 3, 5, respectively, are formed with laterally projecting ears 15, 17, respectively. Each ear 15, 17 is formed with a through slot 16, 18, respectively. A stud 19 and wing nut 21 carried thereby pivot within ear 17 by means of pin 23. It will be understood that the wing nut and stud form no part of the present invention.

Referring to FIGS. 1 and 3, reference numeral 25 indicates two pipes that are joined in longitudinal alignment by means of clamp 1. Each pipe is formed with similar circumferential end flanges 29. Each flange is defined by a face 31 which corresponds to the end of the pipe, by a peripheral surface 33, and by a tapered surface 35. As shown in FIG. 4, the internal side of each clamp piece 3, 5, and 7 is formed with a groove 24. The groove 24 is defined by two oppositely tapered surfaces 26 and by a lower surface 27.

To securely attach pipes 25 to each other in longitudinal alignment, the pipe faces 31 are brought into abutting contact. The peripheral surfaces 33 are aligned, FIG. 3, and the pieces 3, 5, and 7 of clamp 1 are pivoted to encicle the flanges 29, FIG. 2. The flanges are received in the grooves 24 of each piece 3, 5, and 7. The clamp is tightened by turning wing nut 21 on stud 19 so that bearing surface 37 of the wing nut presses against ear 15, FIG. 2. To accommodate the wing nut surface 37, ear 15 may be formed with a countersunk surface 39. As the wing nut is tightened against ear 15, the tapered surfaces 26 of the pieces 3, 5, and 7 cooperate with the flange tapered surfaces 35 to press the faces 31 into intimate sealing contact. If desired, a conventional gasket, not shown, may be employed to further increase the sealing effectiveness of the faces. Lower surface 27 and peripheral surface 33 do not contact each other.

In accordance with the present invention, the clamp 1 is constructed so that the maximum opened position, FIG. 1, is limited in relation to the closed flange engaging position, FIG. 2. This is accomplished in the present instance by forming the pieces 3, 5, and 7 with cooperating stop members. The construction of pieces 3 and 5 insofar as they pertain to the limited opening construction are the same; hence a description of only one is considered sufficient. As shown in FIGS. 1, 4, and 5, the inner end 2 of end piece 3 is formed with a slot 41 extending the depth of the piece, thus forming two lugs 43. Each end of the center piece 7 is formed with a tang 45. The tang 45 is received between the lugs 43. The lugs and tang are relatively pivotable about pin 9.

To constrain the pieces 3, 5, and 7 to maximum opened position, FIG. 1, each end of the center piece 7 is constructed with stop shoulders 47 which extend laterally from each side of the tang 45. In the preferred embodiment, the stop shoulders reach under the lugs 43 of end piece 3. The surfaces 49 of the lugs serve as stop faces which abut and cooperate with the stop shoulders 47 to limit the pivotable motion between the center and end pieces. Thus, the end pieces are constrained from opening beyond the position permitted by the lug stop faces and the tang stop shoulders. Further in accordance with the present invention, the clamp pieces, when in the fully opened position, FIG. 1, lie closer to the closed position, FIG. 2, than a plane 50 passing through pins 9. For clarity, the lugs and tang are not shown in contact; instead an exaggerated amount of clearance is shown between the lugs and tangs.

FIG. 6 shows a modified construction of the clamp of the present invention. In this embodiment, the stop shoulders 51 extend from the tang 45 so as to form a plane generally perpendicular to the longitudinal axis of the center piece 7. The associated stop faces 53 are fabricated as a part of the lugs 43, and they lie generally perpendicular to the longitudinal axis of the end piece 3.

It will be appreciated that the tangs and lugs can lie in opposite pieces, that is, the tang can be formed in the end pieces, and the slot and lugs can be formed in the center piece.

To use the pipe clamp ofthe present invention requires only a minimum of manipulation. Typically, the center piece 7 may be engaged with the pipe flanges 29 with one hand while the second hand holds the faces 31 together. With merely a little flip, the opened lug constrained end pieces 3, 5 will pivot into encircling engagement with the flanges, where they can be conveniently grasped with both hands. The wing nut 21 is then tightened to create a rigid and leakproof joint.

Without further description, it is thought that the advantages to be gained from the disclosed embodiment of the multi-piece pipe clamp will be apparent to those skilled in the art. It is contemplated that various modifications and changes may be made to the pipe clamp of the present invention within the scope of the appended claims without departing from the spirit of the invention.

I claim:

1. A multi-piece pipe clamp for clamping adjacent pipes having flanged ends in longitudinal aligned relationship comprising:

a. at least two generally arcuate clamp pieces having internal grooves adapted to engage the pipe flanges and having at least one pivotable connection therebetween to define a substantially continuous annular groove when in a closed position for engaging the pipe flanges, each pivotal connection including a tang formed on the end of one piece with at least one stop shoulder extending laterally from the tang and a pair of spaced parallel lugs for receiving the tang therebetween on the other piece, the stop shoulder cooperating with the lugs to limit the pivoting motion of the clamp pieces with respect to the closed position to an angle of less than 90°;

b. a pin at each pivotal connection passing laterally through the parallel lugs and tang in a direction parallel to the pipe longitudinal axes to pivotally the clamp pieces; and c. locking means to fasten the free ends of the clamp pieces together to draw the adjacent pipes into intimate clamped contact.

2. A multi-piece pipe clamp for clamping adjacent pipes having flanged ends in longitudinal aligned relationship comprising:

a. at least one generally arcuate center piece having an internal groove adapted to engage the pipe flanges and being adapted on both ends for pivotal connection with an adjacent piece;

b. a pair of generally arcuate end pieces adapted for pivotal connection to opposite ends of the center piece, each end piece including an internal groove to define a substantially continuous circumferential groove with the center piece when in the closed position for engaging the pipe flanges, each pivotal connection between adjacent clamp pieces including a tang formed in the end of one piece with at least one stop shoulder extending laterally from the tang and a pair of spaced parallel lugs for receiving the tang therebetween on the other piece, the stop shoulder cooperating with the lugs to limit the pivoting motion of the clamp pieces to an open position wherein the pieces lie closer to the closed position than a plane passing through the pivotal connections;

c. a pin at each pivotal connection passing through the parallel lugs and tang in a direction parallel to the pipe longitudinal axes to attach the clamp pieces and to provide pivotal connection therebetween; and d. locking means to fasten the free ends of the clamp end pieces together to draw the adjacent pipes into intimate clamped contact.

3. A multi-piece pipe clamp for clamping adjacent pipes having flanged ends in longitudinal aligned relationship comprising:

a. a generally arcuate center piece having an internal groove adapted to engage the pipe flanges and being formed on each end with a tang with at least one stop shoulder extending laterally from the tang;

b. first and second generally arcuate end pieces pivotally connected to the center piece, each end piece being formed with an internal groove to define a substantially continuous circumferential groove with the center piece when in a closed flange encircling position for engaging the pipe flanges, one end of each end piece being formed with a pair of spaced apart substantialy parallel lugs for receiving a tang of the center piece therebetween, the lugs being formed with stop faces to cooperate with the tang stop shoulders to limit the pivotal motion between the center piece and each end piece to an open position wherein the end pieces lie closer to the closed position than a plane passing through the pivotal connections;

c. a pin passing through each tang and pair of lugs in a direction parallel to the pipe longitudinal axes to provide the pivotal connection therebetween; and d. locking means to fasten the free ends of the end pieces together to draw the adjacent pipes into intimate clamped contact.

4. The multi-piece pipe clamp of claim 3 wherein the stop faces of the lugs are generally parallel to the end piece longitudinal axis, and wherein the stop shoulders of each tang form a plane that reaches in a direction generally parallel to the center piece longitudinal axis under the stop faces of the adjacent end piece for abutting contact therewith when the clamp is in the open position to thereby limit the pivotal motion between the center and end pieces.

5. The multi-piece pipe clamp of claim 3 wherein the stop shoulders of each tang form a plane that is generally perpendicular to the longitudinal axis of the center piece and the stop faces of the lugs are generally perpendicular to the longitudinal axis of the respective end piece.

6. The multi-piece pipe clamp of claim 3 wherein the tangs and stop shoulders are formed in the end pieces, and the lugs and stop faces are formed in the center piece.

7. In combination with a pair of pipes having faced flanges on the ends thereof, an improved multi-piece pipe clamp for clamping the faces into intimate contact including a generally arcuate center piece having an internal groove adapted to engage the pipe flanges and being formed on each end with a tang; first and second generally arcuate end pieces pivotally connected to the center piece, each end piece being formed with an internal groove to define a substantially continuous annular groove with the center piece when in a closed position for engaging the pipe flanges, one end of each end piece being formed with a pair of spaced apart substantially parallel lugs for receiving a tang of the center piece therebetween; a pin passing through each pair of lugs and associated tang in a direction parallel to the pipe longitudinal axes to provide pivotal motion therebetween, the pins defining a plane passing therethrough; and locking means to fasten the free ends of the end pieces together to draw the pipe faces into intimate clamped contact;

wherein the improvement comprises:

a. at least one stop shoulder extending laterally from each tang; and b. at least one stop surface formed on each pair of lugs for contact with the stop shoulder to limit the pivotal motion of the end pieces with respect to the center piece to an open position wherein the end pieces lie closer to the closed position than the plane passing through the pins.

8. The improved multi-piece clamp of claim 7 wherein the stop shoulders of each tang form a plane that is generally perpendicular to the longitudinal axis of the center piece and the stop faces lie generally perpendicular to the longitudinal axes of the respective end pieces.

9. The improved multi-piece pipe clamp of claim 7 wherein the stop faces lie generally parallel to the longitudinal axes of the respective end pieces, and wherein the stop shoulders of each tang form a plane that reaches in a direction generally parallel to the center piece longitudinal axis under the stop faces of the adjacent end piece for abutting contact therewith when the clamp is in the open position to thereby limit the pivotal motion between the center and end pieces.

* * * * *